United States Patent
Lehnert et al.

(10) Patent No.: US 9,845,965 B2
(45) Date of Patent: Dec. 19, 2017

(54) AUTOMATED FUNCTIONAL DIAGNOSIS

(75) Inventors: Frank Lehnert, Rüti (CH); Peter Schmidlin, Uster (CH)

(73) Assignee: Belimo Holding AG, Hinwil (CH)

( * ) Notice: Subject to any disclaimer, the term of this patent is extended or adjusted under 35 U.S.C. 154(b) by 530 days.

(21) Appl. No.: 14/111,812

(22) PCT Filed: Apr. 11, 2012

(86) PCT No.: PCT/CH2012/000084
§ 371 (c)(1),
(2), (4) Date: Nov. 19, 2013

(87) PCT Pub. No.: WO2012/139236
PCT Pub. Date: Oct. 18, 2012

(65) Prior Publication Data
US 2014/0067135 A1   Mar. 6, 2014

(30) Foreign Application Priority Data
Apr. 14, 2011   (CH) .......................................... 662/11

(51) Int. Cl.
*F24F 11/00* (2006.01)
*F16K 31/04* (2006.01)
(Continued)

(52) U.S. Cl.
CPC .......... *F24F 11/006* (2013.01); *F16K 31/042* (2013.01); *F16K 37/005* (2013.01);
(Continued)

(58) Field of Classification Search
CPC .. F24F 11/006; F24F 11/0086; F24F 13/1426; F24F 2011/0052;
(Continued)

(56) References Cited

U.S. PATENT DOCUMENTS 6,107,923 A    8/2000  Christol
6,129,113 A *  10/2000 Van Becelaere ........ F16K 1/165
                                                          137/557

(Continued)

FOREIGN PATENT DOCUMENTS

CN         1610807 A       4/2005
DE         44 24 652 A1    1/1996
(Continued)

*Primary Examiner* — Nathan L Laughlin
(74) *Attorney, Agent, or Firm* — Thaddius J. Carvis

(57) ABSTRACT

Disclosed is an HVAC (heating, ventilation and air-conditioning) system which comprises a fluid flow duct (1), a fluid flow valve (7) which is arranged therein and has a valve body (5) in the fluid flow duct (1) and a valve motor (15) which moves the valve body (5), a control circuit for activating the valve motor, a sensor (8) in the fluid flow duct (1) and an evaluation module for evaluating signals of the sensor. To produce an automated functional control, the following procedure is adopted: a first actuation signal is preset for the valve motor by the control circuit, and the actuation signal corresponds to a first setpoint position of the valve body (5), registration of a first signal of the sensor (8) by the evaluation module, and determination of a functional diagnosis of the fluid flow valve on the basis of the first signal of the sensor.

14 Claims, 2 Drawing Sheets

(51) Int. Cl.
  *F16K 37/00* (2006.01)
  *F24F 13/14* (2006.01)

(52) U.S. Cl.
  CPC ...... *F16K 37/0041* (2013.01); *F24F 11/0086* (2013.01); *F24F 13/1426* (2013.01); *F24F 2011/0038* (2013.01); *F24F 2011/0042* (2013.01); *F24F 2011/0052* (2013.01); *F24F 2011/0056* (2013.01)

(58) Field of Classification Search
  CPC ....... F24F 2011/0042; F24F 2011/0056; F24F 2011/0038; F16K 37/0041; F16K 37/005; F16K 31/042
  See application file for complete search history.

(56) References Cited

U.S. PATENT DOCUMENTS

| | | | |
|---|---|---|---|
| 6,198,243 B1 | 3/2001 | Ritanich et al. | |
| 6,334,959 B1 | 1/2002 | Sutton et al. | |
| 6,752,714 B1* | 6/2004 | Mann | A62C 2/065 454/257 |
| 6,792,767 B1* | 9/2004 | Pargeter | F24F 3/153 236/44 C |
| 2002/0959586 | 7/2002 | Ito et al. | |
| 2004/0186599 A1* | 9/2004 | Ahmed | G05B 17/02 700/86 |
| 2004/0224627 A1* | 11/2004 | Becelaere | F24F 11/0001 454/257 |
| 2005/0155365 A1* | 7/2005 | Shah | F24F 3/0442 62/186 |
| 2005/0183725 A1* | 8/2005 | Gumaste | A61M 15/0085 128/203.15 |
| 2005/0274417 A1 | 12/2005 | Perry | |
| 2007/0017738 A1* | 1/2007 | Truss | A62C 2/12 181/209 |
| 2013/0239655 A1* | 9/2013 | Tao | G01N 33/497 73/23.3 |

FOREIGN PATENT DOCUMENTS

| | | |
|---|---|---|
| WO | 01/01215 A1 | 1/2001 |
| WO | 2005059669 A1 | 6/2005 |
| WO | 2006131991 A1 | 4/2006 |
| WO | 2005053975 A1 | 6/2006 |
| WO | 2007006162 A1 | 1/2007 |
| WO | 2009109056 A1 | 9/2009 |

* cited by examiner

AUTOMATED FUNCTIONAL DIAGNOSIS

TECHNICAL BACKGROUND

The invention relates to a method and to a system for the automated functional monitoring of an HVAC (heating, ventilation and air-conditioning) system which comprises the following components:
a) a fluid flow duct (1),
b) a fluid flow valve (5) which is arranged therein and has a valve body (5) in the fluid flow duct (1) and a valve motor (15) which moves the valve body (5),
c) a control circuit for actuating the valve motor,
d) a sensor in the fluid flow duct and
e) an evaluation module for evaluating signals of the sensor.

In addition, the invention relates to a fluid flow valve which can be used in an HVAC system.

PRIOR ART

There are regulations according to which the operator of an HVAC (heating, ventilation and air-conditioning) system must regularly check the method of functioning thereof. This is important, in particular, for safety components such as fire dampers. To do this, an inspector must check, for example every six months, in situ, inter alia, the closing of the flaps of the HVAC system and/or must monitor parameters of the volume flows when the system fans are running. Such tests may reveal whether flaps are functioning satisfactorily, built-in filters have to be replaced or there are leaks in the system. With these tests, an inspector can also check, when activating an HVAC system, whether, for example, drives and flaps are mounted satisfactorily and are connected to one another and the ventilation ducts are sealed.

By means of the tests of an HVAC system it is also possible to check the functional capability of safety-related components, that is to say, for example, fire dampers, which must reliably perform their function in the event of a fire. The tests can, however, also provide indications so that the HVAC system can be operated in an optimum way, with the result that, for example, a defective flap can be repaired or replaced in order, depending on the case, to achieve a saving in operating costs or to improve the spatial comfort.

Control valves for ventilation systems are known in a very wide variety of embodiments. Examples of modern systems are known, for example, from WO 2005/053975 (Belimo) and WO 2009/109056 (Belimo). Motor-operated fire dampers are also commercially available.

From other technical applications it is known that the functional state of a device can be determined automatically or continuously during operation.

For example, WO 2005/059669 presents the measurement of a static pressure in an HVAC system in order to estimate the state of a filter of the HVAC system. It is possible to expect the pressure to increase as soon as the filter is blocked. The changes in the pressure are checked periodically and the state of the filter is displayed indicatively to the user on a display, and replacement is suggested if a predefinable state is reached.

U.S. Pat. No. 6,107,923 discloses the detection of the state of a filter in a ventilation system of a vehicle. In a specific operating state, a parameter of an airflow which is directed into the passenger compartment is determined. The parameter is compared with a reference value, and it is determined whether the filter has to be replaced. A pressure, a volume or a speed can be determined as parameters.

U.S. Pat. No. 6,334,959

U.S. Pat. No. 6,334,959 is concerned with the measurement of the residual service life of a filter. A fluid which is loaded with particles is conducted through the filter and a pressure difference is measured at the filter. The measurement is digitized and compared with stored values in order to indicate the residual service life of the filter. The stored values can be determined from test measurements.

The checking of HVAC systems is complex since various tests have to be carried out in situ by one or more inspectors in order to check the functional capability of the system. As a result, to a certain extent considerable costs are incurred. An attempt is therefore made to keep the frequency of the tests as low as possible, for example in accordance with legal regulations or in accordance with a cost framework. For this reason, test intervals of several months often arise. Faults in the HVAC system therefore cannot be detected until after a considerable time delay in some cases, as a result of which a safety risk or non-optimum operation of the HVAC system may remain undiscovered over a relatively long time.

SUMMARY OF THE INVENTION

The object of the invention is to provide an appropriate method in the technical field specified at the beginning, and a system, which permit efficient checking of an HVAC system, can be carried out frequently and are cost-effective.

The means of achieving the object is defined by the features of the independent claims. A system which comprises the following components is assumed:
a) a fluid flow duct (1),
b) a fluid flow valve (5) which is arranged therein and has a valve body (5) in the fluid flow duct (1) and a valve motor (15) which moves the valve body (5),
c) a control circuit for actuating the valve motor,
d) a sensor in the fluid flow duct and
e) an evaluation module for evaluating signals of the sensor.

The method according the invention comprises the following steps:
a) predefining a first actuation signal to the valve motor by means of the control circuit, wherein the actuation signal corresponds to a first setpoint position of the valve body (5),
b) registering a first signal of the sensor by means of the evaluation module, and
c) determining a functional diagnosis of the fluid flow valve on the basis of the first signal of the sensor.

Within the scope of the invention, the valve body is to be moved at least once. The first actuation signal is therefore to correspond to a first setpoint position of the fluid flow valve, which is changed compared to a present setpoint position.

The functional diagnosis is a value which indicates whether the fluid flow valve actually carries out the control instructions satisfactorily. If, for example, a mechanical deficiency or defect is present, the valve body will not be moved into the setpoint positions predefined by the control circuit. Correspondingly, the first sensor signal will not result in an expected measured value. As a result, by evaluating or comparing the sensed sensor signals, a malfunction can be diagnosed. The same diagnosis will be made if, for example, the motor fails (or is not connected to the current) or if the cabling is faulty with the result that the control signal does not arrive at the motor at all.

The control circuit can be implemented in a control center which monitors an entire building. However, it can also be accommodated in a subordinate storey controller (which controls and monitors the drives on one storey) or in the same housing as the valve motor.

The evaluation module can be a computing program which is installed in the central controller of the HVAC system or which runs on a processor which is arranged in the housing of the drive. Furthermore, the evaluation can also take place at a different location, for example on a maintenance computer which is connected via the Internet to a processor for controlling the valve motor or for controlling the fluid flow at the location of the fluid flow valve.

With the specified method it is possible to check the functioning of the fluid flow valve in an automated fashion. The predefinition of a setpoint position which is different from the present valve body position brings about a change in the available cross section of the fluid flow duct, which can be detected by the sensors which are preferably present in any case in the surroundings of the fluid flow valve in the fluid flow duct. Of course, it is also possible to predefine a plurality of different setpoint positions, for each of which the associated measurement signal of the sensor can be sensed, with the result that a detailed functional diagnosis can be produced.

The evaluation module optionally determines the functional diagnosis in the form of one of two or three possible states. The two possible states can correspond to the value "functionally capable" and "faulty". If the value "faulty" or "unclear" is output as a result of the functional diagnosis, this is an indication that the fluid flow valve has to be inspected and repaired in situ by a technician. If necessary, a third state may be present which corresponds to the value "unclear". The value "unclear" can express the fact that, although the fluid flow valve is functioning, it does not supply the desired optimum sensor signals. In such a case, it is, under certain circumstances, still possible to wait for the inspection.

It is also conceivable that four or more result states are provided. However, this will make sense only if the sensor signals permit a sufficiently differentiated functional diagnosis. However, as a rule it will be satisfactory to make available as few different functional diagnoses as possible (that is to say not more than three). It is to be noted that within the scope of the invention what is significant is not the words "functionally capable", "faulty" and "unclear" but rather the technical meaning thereof. What is decisive is that, for example, only two values are possible as a result of the functional diagnosis.

The result of the functional diagnosis is preferably transmitted to a central unit which is configured to monitor a plurality of fluid flow valves. This may be the central unit of the building which also monitors and controls the HVAC system. However, it can also be a controller which is provided in a fluid flow valve which functions as a master. The fluid flow valves of an HVAC system therefore preferably have a data transmission module (for example according to the Ethernet standard) by means of which they can transmit or exchange control signals, sensor measured values and functional diagnoses.

Alternatively or additionally, the result of the functional diagnosis can be stored in a local data memory in the fluid flow valve or displayed on a cost-effective display on the fluid flow valve.

Optionally, two different setpoint positions are predefined and correspondingly two sensor signals are sensed. In addition, prior to the registration of the first and the second signals of the sensor, a fluid flow can be made available in the fluid flow duct of the HVAC system. It is then possible to calculate the functional diagnosis on the basis of a change in the fluid flow, which functional diagnosis must take place when the setpoint position of the valve body changes. In this case, the sensor is designed to measure a fluid flow parameter of the fluid flow. In particular, the sensor is designed to measure a fluid pressure (or pressure drop), a fluid speed or a fluid volume (per time unit).

The fluid flow can be provided, for example, by virtue of the fact that a control signal is transmitted to a fluid flow drive (fan, blower) in order to produce a fluid flow with a specific fluid flow parameter (for example a specific fluid speed). It is, of course, also possible to operate with a predefined (typically constant) fluid flow. The provision thereof means that it is ensured that a fluid flow is present in the HVAC system. It is therefore possible, for example, for a fluid flow ("through-flow") to be naturally present in a fluid flow duct, with the result that, the "provision" of said flow within the scope of the invention is not to be understood as being limited to active generation by means of a drive.

In particular, if satisfactory closing of the valve body is being diagnosed, an acoustic sensor (sound sensor, microphone) can be used. On one side of the valve body (in the fluid flow duct) the acoustic sensor is preferably arranged, and on the other side of the valve body (in the fluid flow duct) an acoustic signal generator (sound generator such as, for example, a loudspeaker or a piezo-element) is arranged. If the fluid flow duct does not close correctly when the actuation signal for the closed setpoint position is predefined, this can be very easily detected on the basis of unsatisfactory damping of the acoustic signal at the location of the acoustic sensor. If air is transported in the fluid flow duct, the acoustic measurement is particularly sensitive and therefore advantageous.

The sound does not necessarily have to be generated at the location of the fluid flow duct. It can also be generated at a remote location (for example for two or more fluid flow valves simultaneously). It is also conceivable that of a (continuously) present disruptive noise (which is output, for example, by a fluid flow drive of the HVAC) and that only the microphone is present at the location of the fluid flow valve.

A fluid pressure is preferably sensed as a fluid flow parameter. Pressure sensors are already widespread in existing systems, and the invention can therefore be easily implemented in existing systems with installed pressure sensors.

A fluid speed can be sensed as an alternative to, or in addition to, the fluid pressure as a fluid flow parameter.

Alternatively or additionally, a fluid volume per time unit is sensed as a fluid flow parameter. It is therefore possible, for example, to determine the fluid volume which flows through the fluid flow duct during a specific measuring period, in order to determine by means of a comparison with a setpoint value.

One of the two specified setpoint positions is preferably a closed valve position. The second of the specified setpoint positions may be, for example, the completely open valve position. With many valves, in particular with fire dampers, it is particularly important that the fluid flow duct can be closed completely if an emergency (for example fire alarm) occurs in the system. However, there are also valves which are to be opened completely in an emergency. In these valves, the open setpoint position can be selected as the setpoint position which is to be predefined according to the invention.

During the complete closure or complete opening of the fluid flow valve, maximum values are reached for the fluid flow, that is to say for example a maximum fluid speed or a maximum fluid pressure. The sensitivity of the measurement can be improved in this way, which optimizes the reliability of the evaluation.

Before the predefinition of the first actuation signal or after the registration of the first signal of the sensor, the following steps are preferably carried out:
a) predefining a second actuation signal, different from the first actuation signal, to the valve motor by means of the control circuit, wherein the second actuation signal corresponds to a second setpoint position of the fluid flow valve (5),
b) registering a second signal of the sensor, and
c) determining the functional diagnosis of the fluid flow valve on the basis of the first and the second signals of the sensor by means of the evaluation module (9).

The predefinition of the second actuation signal can comprise the fact that an already existing, defined position is assumed, with the result that the valve body does not change its position (yet). This is the case when the fluid flow valve is actuated only in an emergency and on a standard basis is in a maintenance position or position of rest. However, it is also possible to approach actively two different setpoint positions, for example the open and the closed valve positions.

It is not absolutely necessary for one of the setpoint positions to be the completely closed valve position and for the other to be the completely open valve position. It is, for example, also possible that, in addition to the closed and open setpoint positions, a half-open position is selected. This may be the case, for example, when the fluid flow valve in fact assumes a half-open position (or an intermediate position, at the time of the function test according to the invention.

The evaluation of the measurement data or the calculation of the functional diagnosis preferably take place in such a way that the satisfactory seal of a fluid flow duct can preferably be determined as a functional state. After the provision of a fluid flow, the fluid flow valve is completely closed and, for example, a fluid pressure is sensed. The sensed fluid pressure is compared with an expected fluid pressure or with a fluid pressure from a reference measurement. If the comparison exceeds, for example, a tolerance of 10%, the evaluation module signals that there is a leak in the fluid duct. This test assumes, of course, that the fluid flow valve itself reliably closes completely. The complete closure may take place, for example, with the already mentioned acoustic sensors, that is to say independently of the pressure measurement. This is an example of the fact that it may be appropriate to use both acoustic sensors and also sensors for sensing fluid flow parameters (pressure, speed, volume flow).

The method according to the invention can be used, in particular, for the regular checking of fire damper devices. That is to say that a fire damper is provided as a fluid flow valve, and that the functional diagnosis is determined in such a way that the sealed closure of the fire damper is determined. Alternatively, the satisfactory opening of a fire damper can also be diagnosed.

The functional diagnosis (that is to say the predefinition of the setpoint positions and the measurement of the sensor signals) can be actuated in either a decentralized or centralized fashion. In the case of decentralized actuation, the actuation occurs, for example, directly by means of the actuation module (control circuit) assigned to the fluid flow valve, actuation occurring, for example, on the basis of a schedule (at regular or selectively irregular intervals), on the basis of other (separate) state measurements which require functional monitoring, or on the basis of a specific event. In the case of centralized actuation, a control signal is typically transmitted individually to each fluid flow valve, specifically, in particular, by a central system controller to the actuation module which is installed in a decentralized fashion and with which a fluid flow valve can be actuated. The objective of the actuation of the actuation module is to produce a certain functional state (for example "valve closed" or "valve open"). The actuation is therefore the electronic instruction to the actuation module to adjust, for example, the actuation angle of the valve body of the fluid flow valve to a predefined position.

Subsequently, there is measurement of how the fluid flow changes or is adjusted on the basis of the changing or adjusting of the position of the valve body. A change can simply occur by virtue of the fact that the setpoint position which is predefined by the actuation is different from the setpoint position which is present before the actuation (and which corresponds, for example, to the present regulating mode). Of course, a change can also be selectively brought about by firstly an actuation for a first setpoint position and then an actuation for a second setpoint position being transmitted and by a measurement of the fluid flow parameters being carried out after each transmission. (The first and the second setpoint positions are different).

If the fluid flow parameter does not change despite the selective changing of the setpoint position of the valve body, this is an indication of a malfunction. This is determined by evaluating the acquired measurement data according to the invention. The evaluation includes the computational result that a predefined component of the HVAC system is functioning correctly or incorrectly. The evaluation can take place, for example, by comparison of a plurality of measurements with different valve settings or by the comparison with a setpoint value. The fluid flow valve can relate, for example, to a valve or a flap. If the functional state is determined, an electronic message or a signal can be output or displayed by a decentralized device (actuation module, local master valve) or by a centralized system controller, with the result that the maintenance personnel can go to check the functionally incapable component in situ. In this way, the maintenance and the functional monitoring can be automated and carried out regularly with a lower level of expenditure in terms of personnel.

The method according to the invention should not be confused with the customary regulating mode of an HVAC system. Although a fluid flow is also made available in the regulating mode (i.e. during the regulation with ventilation of a building in order to set the air supply and climatic conditions of the rooms according to requirements), a fluid flow valve actuated (in order, for example, to attenuate the airflow locally) and a fluid flow parameter acquired (in order, for example, to update the operating state of the system and to provide a basis for the further regulation of the air supply), during the usual regulating mode there is no centralized or decentralized evaluation which has the result that the component to be checked (for example the fluid flow valve) is functionally capable or not. In contrast, in the normal operating mode it is assumed that the components are functioning (and are not defective), and after the actuation thereof it is calculated on the basis of the measurement data whether, for example, the fluid flow valve has actually carried out the actuation correctly. The usual regulating mode of the central controller is based on the calculated and output control signals for the setpoint position.

When the measurement data are evaluated, a comparison is preferably made with reference data. The reference data can originate from a measurement such as, for example, a calibration measurement which has taken place before the actuation. In another variant embodiment, the reference data can be based on computational models such as, for example, a flow model which is calculated completely by the evaluation unit on the basis of the geometry (cross section, longitudinal profile etc.) of the flow duct and, for example, the pressure conditions and the physical properties (for example viscosity) of the fluid (or has been calculated completely by a computer prior to the activation).

An airflow is preferably made available as a fluid flow. The invention can then be used in HVAC systems which use air as a means for transportation for heat or moisture.

Alternatively a water flow is set as a fluid flow. In this context, for example heat is transported in water lines leading to the heating bodies. The invention is therefore applied in practice in any HVAC system which also uses water for transporting heat or cold alongside air.

The first control data is preferably transmitted to the fluid flow valve or the actuation module (if necessary after the provision of a fluid flow). The first measurement data (sensor signals) of a fluid flow parameter of the fluid flow are subsequently acquired and transmitted to the evaluation module. The second control data is then transmitted to the actuation module in order to bring about another functional state (i.e. another valve body setting), and subsequently the second measurement data of a fluid flow parameter of the fluid flow are acquired and transmitted to the evaluation module. Finally, the first measurement data and the second measurement data are evaluated in the evaluation module in order to determine the functional state of the HVAC system. During the first or second actuation of the actuation module, a first or second setting (the second setting being different from the first setting) of the fluid flow valve is implemented. The difference between the fluid flow parameters for two different regulator settings is therefore determined. A functional state of the HVAC system can be detected from this difference on the basis of calibration measurements or physical models.

The evaluation of the measurement data is preferably carried out in such a way that the satisfactory adjustment of a fluid flow valve can be determined as a functional state. After the provision of a fluid flow, the fluid flow valve is adjusted to a first and a second position and, for example, a difference between the fluid pressures at these two positions is acquired. If the difference in fluid pressure does not correspond to the value which is expected from the first and second positions of the fluid flow valve, that is to say it exceeds, for example, a tolerance of 10%, the evaluation module signals that a functional fault of the fluid flow valve is present.

A system according to the invention (device) for the automated functional monitoring of an HVAC (heating, ventilation and air-conditioning) system comprises
a) a fluid flow duct,
b) a fluid flow valve which is arranged therein and which has a valve body in the fluid flow duct and a valve motor which moves the valve body and has the purpose of actuating the fluid flow valve,
c) a control circuit for controlling the valve motor and for predefining a first actuation signal to the valve motor (15; 22),
d) a sensor in the fluid flow duct, and
e) an evaluation module for determining a functional diagnosis of the fluid flow valve on the basis of a signal of the sensor.

The evaluation module is, for example, a computing program which runs on a processor of a central computer (which monitors a plurality of fluid flow valves) or of an intelligent fluid flow valve.

The control circuit is preferably programmed to carry out the sequencing of the automatic functional test. It carries out, for example, in particular the following steps:
a) predefining of a first actuation signal to the valve motor by means of the control circuit, wherein the actuation signal corresponds to a first setpoint position of the fluid flow valve,
b) registering a first signal of the sensor by means of the evaluation module,
c) predefining a second actuation signal, different from the first actuation signal, to the valve motor by means of the control circuit, wherein the actuation signal corresponds to a second setpoint position of the fluid flow valve, and
d) registering a second signal of the sensor by means of the evaluation module.

As already mentioned above in relation to the method, a system according to the invention optionally comprises a fluid flow drive for making available a fluid flow in a fluid flow duct of the HVAC system. The sensor is then preferably designed as a fluid flow sensor for acquiring measurement data relating to a fluid flow parameter of the fluid flow.

A fluid flow with a specific value of a fluid flow parameter such as, for example, a specified fluid speed is generated by means of the fluid flow drive. With a suitable sensor, the present value of the fluid flow parameter (for example fluid pressure, fluid speed and/or fluid volume per time unit) is determined after the first and second setpoint positions have been predefined.

The evaluation module is preferably configured to compare a fluid flow parameter at regular intervals and to determine the functional state of a component on the basis of changes.

The system can (as already mentioned above) have further sensors, in particular acoustic sensors, in addition to or as an alternative to the fluid flow sensors. Furthermore, acoustic signal generators can be provided which generate the acoustic signal to be detected. However, it is also conceivable that the acoustic sensors evaluate signals which occur in any case in the region of the valve body owing to disturbances or noises, and are influenced by the (open or closed) position of the valve body (background noise).

The sensors are arranged upstream or downstream of the valve body in the fluid flow duct in the direction of flow. Typically, they are at a distance of less than 1 m, in particular less than 50 cm, from the valve body.

The system preferably comprises an actuation module for actuating a fluid flow valve of the HVAC system. A fluid flow valve is set by the control circuit (or the actuation module), and the fluid flow parameter is changed. This change is sensed by the fluid flow sensor and the sensed measurement data are evaluated by means of an evaluation module, and a functional state of a component of the HVAC system is determined. The evaluation can be carried out, for example, by means of the comparison of a plurality of measurements with different setpoint positions or by means of the comparison with a setpoint value.

The evaluation module preferably has a memory for storing reference data, wherein the evaluation module is configured to determine a functional state of a component of the HVAC system on the basis of a comparison of the measurement data with the reference data. Reference data may be produced, in particular, on the basis of calibration measurements.

In accordance with the method disclosed above, in the system according to the invention the evaluation module is preferably configured to determine, on the basis of the measurement data as the functional state of the HVAC system the satisfactory adjustment (i.e. the adjustment corresponding to the previously transmitted control signals) of a fluid flow valve, the satisfactory seal (i.e. the seal corresponding to the predefined values) of a fluid flow duct and/or the satisfactory permeability (i.e. the seal which is necessary and at least required for filtering) of a filter. The system according to the invention is therefore configured to check the functional capability of decentralized components of an HVAC system using the centralized system controller.

The method according to the invention can also be implemented with what is referred to as an intelligent fluid flow valve. This comprises:
a) a valve body which can be arranged in the fluid flow duct,
b) a valve motor which moves the valve body and has the purpose of actuating the fluid flow valve,
c) a control circuit for controlling the valve motor,
d) an interface with a sensor which can be arranged in the fluid flow duct, and
e) an evaluation module for evaluating signals of the sensor.

The control circuit is designed to predefine a first actuation signal to the valve motor, wherein the actuation signal corresponds to a first setpoint position of the valve body. And the evaluation module is designed to register a first signal of the sensor and to calculate a functional diagnosis of the fluid flow valve (20) on the basis of the first signal of the sensor (28).

Such a fluid flow valve can be connected to a control center or a remote maintenance computer via a data link, and permits an automated functional diagnosis without a large amount of expenditure. The sensor is preferably installed directly in the fluid flow valve (or in a housing or tubular piece which is part of the fluid flow valve). However, it is also possible simply to provide a connection socket (as an interface) for a plug of a separate sensor device.

It is particularly advantageous if the fluid flow valve comprises a microphone as a sensor, and that it comprises an electro-acoustic transducer (27) for generating sound signals. As a result, it is possible to determine the sealed closed position very precisely and cost-effectively. However, the sensors mentioned above for acquiring fluid flow parameters can also be installed in the fluid flow valve.

What has already been stated above in the context of the method according to the invention with respect to a second setpoint position and an associated second measurement of the sensor signal also applies correspondingly to a fluid flow valve with an integrated control circuit and integrated evaluation module.

The valve body can be inserted in a short tubular piece which can be connected by its ends to the fluid duct. However, there are also fluid flow valves which are designed as a flap and which can be inserted into an existing pipe (cf. WO 2005/053975, Belimo). Flaps are also known which are already provided with a sensor (cf. WO 2009/109056, Belimo). With these known valves, the invention can be implemented without a large degree of additional expenditure by virtue of the fact that the controller is integrated into the housing of the drive. The content of the two publications WO 2005/053975 and WO 2009/109056 is herewith included by reference in the present application.

The fluid flow valve is preferably a fire damper device for installation in a fluid flow duct of an HVAC system.

Further advantageous embodiments and feature combinations of the invention can be found in the following detailed description and all of the patent claims.

BRIEF DESCRIPTION OF THE DRAWINGS

In the drawings which are used to explain the exemplary embodiments.

Identical parts are basically provided with the same reference symbols in the figures.

EMBODIMENTS OF THE INVENTION

Figure 1:
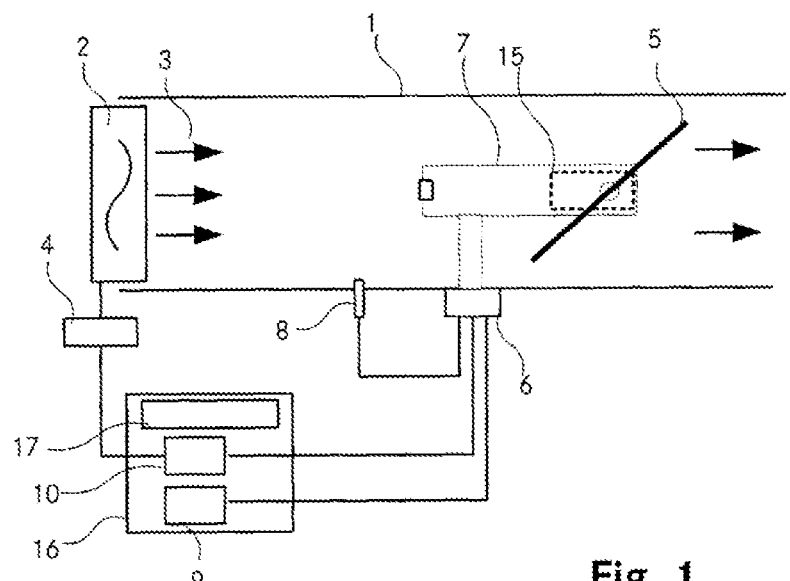
FIG. 1 shows a schematic illustration of an HVAC system with functional diagnosis for a fluid flow valve.

FIG. 1 shows a system according to the invention for the automated functional monitoring of an HVAC (heating, ventilation and air-conditioning) system. A fluid flow 3 is generated in a fluid flow duct 1 of an HVAC system by means of a fluid flow drive 2.

The fluid flow 3 is, for example, an airflow with a specific temperature, a specific humidity, a specific degree of cleanliness and/or any other parameter which is to be regulated or can be predefined. Said fluid flow 3 is guided into the spaces of a building in order to produce a desired spatial climate there. To this end, the HVAC system comprises, for example, heating devices, cooling devices, humidifying devices, drying devices, filter devices which are known per se or any other devices for influencing parameters of the airflow. These devices and equipment are used in a known fashion to regulate the spatial climate and are not explained or illustrated here in more detail since they are not part of the invention.

The fluid flow drive 2 can have, in particular, a frequency-converter-controlled fan or a blower in order to generate an airflow in ventilation ducts of an HVAC system. In order to make available the fluid flow 3 with the fluid flow drive 2, a drive controller 4 is provided with which the fluid flow drive 2 is controlled. The drive controller 4 and the fluid flow drive 2 can be combined in one unit, or can be constructed as separate units, as outlined schematically in FIG. 1. The drive controller can predefine or regulate, for example, the switching on or off of the fluid flow drive 2, the setting of a rotational speed or any other feature of the fluid flow drive 2. Depending on the control of the fluid flow drive 2, a fluid flow 3 is generated which has, for example, a specific fluid flow speed, a specific fluid flow pressure or a specific fluid flow volume.

In order to obtain a specific fluid flow 3 at a specific location or in a specific section of the fluid flow duct 1, an adjustable fluid flow valve 7 is provided (as indicated schematically in FIG. 1, which fluid flow valve 7 comprises in the present case an air flap 5 and a motor 15. The mechanical and electrical design of the fluid flow valve 7 may be as is known, for example, from WO 2005/053975 A1 (Belimo). Another (modular) design is known, for example, from WO 2007/006162 A1 (Belimo), according to which a motor with an installed regulator can be fitted onto a shaft of a flap.

The air flap 5 may, for example, be completely closed in order to interrupt the fluid flow 3 or it can be completely opened in order to allow the maximum fluid flow 3 to pass through. In addition, any desired intermediate positions of the air flap 5 can be set, as a result of which the fluid flow 3 can be regulated between a minimum value and a maximum value as required.

In order to set the fluid flow valve 5, an actuation module 6 (electronic controller) is provided which controls the motor 15 (electric drive of the air flap). According to one preferred embodiment, the motor 15 and actuation module 6 are accommodated in a common housing on which the air flap 5 is rotatably mounted. A separate regulating circuit, or one which is integrated into the housing of the drive (or actuation module), regulates, during normal operation, the fluid flow 3 to a value which is transmitted by a building control system 16, if appropriate using the signals of a fluid flow sensor 8 described below.

A fluid flow sensor 8, with which a fluid flow parameter such as, for example, a fluid pressure, a fluid speed, a fluid volume per time unit, or any other fluid flow parameter, can be sensed is arranged in the fluid flow duct 1. The fluid flow sensor 8 can be an anemometer as described in WO 2009/109056 (Belimo), which document contains a particularly preferred embodiment of a flap with an associated sensor.

The fluid flow sensor 8 projects, for example, into the fluid flow duct 1. The fluid flow sensor 8 can be attached to the inner wall of the fluid flow duct 1 cabled to the outside or, when necessary, a mount (for example a rod) can be provided for the sensor in order to position the fluid flow sensor 8 in the center of the fluid flow duct. The fluid flow sensor 8 can be arranged upstream or downstream in the vicinity of the fluid flow valve 7 (for example, 0.5 m away from the air flap). If the fluid flow sensor 8 is arranged upstream of the air flap 5, an increased fluid pressure, a reduced fluid speed or a decreased fluid volume is measured per time unit when the air flap 5 is closed compared to when the flap position is open. In the case of a fluid flow sensor 8 which is arranged downstream of the air flap 5, the illustrated qualitative relationships are exactly reversed.

FIG. 1 is a schematic illustration of an evaluation module 9. The latter is connected by signals to the fluid flow sensor 8, with the result that signals which are sensed by the fluid flow sensor 8 can be transmitted to the evaluation module 9 and stored and processed there as measurement data. The evaluation module 9 comprises, for example, a programmable microprocessor with a memory for storing data and programs. In the present example, the evaluation module 9 is implemented centrally in a central computer of a building controller 16.

In the present example, part of the control process according to the invention is carried out by the building controller 16. It is therefore connected by signals to the drive controller 4 or to the fluid flow drive 2 and the actuation module 6 and comprises, for example, an executable software program and hardware interfaces in order to transmit control signals to the drive controller 4 and to the actuation module 6 (and to receive them therefrom). The evaluation module 9 is stored, for example, as an executable computing program (software module), while the drive controller 4 or the fluid flow drive 2 and the actuation module 6 are decentralized equipment modules which are located distributed in the system.

When a fluid flow valve 5 is installed in an HVAC system, the mechanical connection between the air flap 5 and the drive 15 or the electrical connection between the actuation module 6 and the building controller may not be formed correctly. This connection can also become disconnected during normal operation (owing to a fault). In particular in the case of air flaps which have to be moved into a predefined position in the event of a catastrophe such as a fire, such disconnected connections can result in the damage limitation means not being implemented as desired.

The following exemplary embodiments of the inventive functional monitoring of an HVAC system assume that the fluid flow sensor 8 is arranged downstream of the fluid flow drive 2 on the fluid flow duct 1, and the air flap 5 is arranged downstream of the fluid flow sensor 8.

Example 1

For the automated functional monitoring of the air flap 5, the control module 10 generates a control signal and transmits it to the drive controller 4 or the fluid flow drive 2 in order to set the fluid flow drive 2 to a specific power level and to make available a fluid flow 3.

The control module 10 then generates a first control signal and transmits it to the actuation module 6 in order to set the air flap 5 to a first setpoint position SP1. This first setpoint position is, for example, the entirely opened position of the air flap (valve body).

Subsequently, the fluid pressure of the fluid flow 3 is sensed by the fluid flow sensor 8 and stored as first fluid pressure p1 in the evaluation module 9.

In a subsequent step, a second control signal is transmitted to the actuation module 6 in order to move the air flap 5 into a second setpoint position SP2. This corresponds, for example, to the entirely closed position of the air flap.

After this, the fluid pressure of the fluid flow 3 is sensed again and stored as second fluid pressure p2 in the evaluation module 9.

A setpoint value of the fluid pressure difference between the first fluid pressure p1 and the second fluid pressure p2 is obtained from the set power level of the fluid flow drive 2 and the difference between the first and second setpoint positions. The setpoint value of the fluid pressure difference dp (which corresponds to satisfactory functioning of the fluid flow valve) is stored, for example, in a setpoint value table. The setpoint value of the fluid pressure difference dp is compared with the difference p2−p1 between the measured first and second fluid pressures. If the comparison is within a specific tolerance, for example within a tolerance of 10% (p2−p1≤dp/10), the functional diagnosis "functionally capable" is then determined by the evaluation module 9. That is to say it is confirmed that the fluid flow valve has actually satisfactorily assumed the predefined setpoint value positions.

If the deviation between the pressure difference of the sensor signals and the setpoint value of the pressure difference is greater than, for example, 10% (p2−p1>dp/10), the functional diagnosis "faulty" is determined by the evaluation module 9. That is to say the air flap does not implement the control signals satisfactorily.

The result of the functional diagnosis can be displayed on the display 17 of the control center (building control system 16) or stored in a file. It can also be transmitted to another computer workstation of a maintenance service via a (wireless or line-bound) data transmission link, wherein the functional state of the fluid flow valve 7 is displayed on a display of the computer workstation.

Example 2

A particularly simple design for producing the functional diagnosis is that a single control signal is transmitted to the actuation module, which control signal corresponds to the closed position (setpoint position) of the valve body. Then, with a volume flow sensor it is measured whether the flow in the fluid flow duct 1 has come to a standstill. If this is the case, the evaluation module generates the functional diagnosis "functionally capable". If the volume of flow is higher than a predefined limiting value, the functional diagnosis "faulty" is produced.

In addition, a third state of the functional diagnosis can be provided which categorizes the seal as still sufficient but critical. This state is referred to within the scope of the invention as "unclear".

Example 3

Instead of a first fluid pressure and a second fluid pressure, a series of fluid pressure values can be determined, wherein a fluid pressure of the fluid flow 3 is determined for each of a variety of settings of the fluid flow valve 7. As a result, the satisfactory method of functioning of the fluid flow valve 7 can be checked for a specific working range, or the entire working range, of the fluid flow valve 7. During the sensing of a series of flow pressure values, it is possible to dispense with a comparison with setpoint values and to determine the satisfactory functional state of the fluid flow valve 7 only from the increase or decrease in the fluid pressure difference between two adjacent fluid pressure values.

Example 4

The method according to the invention can also occur as a brief interruption in the normal operation. The normal operation is defined by the fact that the spatial ventilation is regulated by the fluid flow valve on the basis of the parameters measured in the space or in the air extraction of the space or a parameter selection predefined by the user. That is to say the fluid flow valve is an additional part in an otherwise known regulating circuit.

The known regulating circuit is to be understood, for example, as follows: a reference variable (for example a predefined volume flow or airflow per time unit) is fed to a regulator (for example an electronic regulating circuit which controls the drive motor of the air flap), wherein the regulator outputs a manipulated variable (for example a specific angular position of the air flap) in order to set the controlled system (for example, the volume flow in the ventilation duct). The regulated variable assigned to the reference variable (said regulated variable being, for example, the actual volume flow measured by a sensor in the ventilation duct) is fed back to a differential amplifier which compares the reference variable (specifically the predefined volume flow) with the regulated variable (specifically the actual measured volume flow), and feeds the resulting fault signal back to the regulator.

A possible embodiment then takes the form of this regulating circuit being briefly interrupted for the sake of a functional diagnosis according to the invention. Therefore, at a specific time (for example on the basis of a timer or on the basis of actuation by the central controller), an entirely opened (or closed) position of the valve body is predefined as a setpoint position of the fluid flow valve. It is then measured whether the fluid flow corresponds to the expected value (maximum throughflow or no throughflow). This comparison and the outputting of a corresponding functional diagnosis value are carried out by the evaluation module. The normal operation is then resumed, i.e. the valve body is moved into the position in which it was before the interruption in the normal operation.

The fluid flow valve may normally be operated only in a central region (for example between 30% and 60% open) and functions there, but it may not be able to move at all into an entirely open or entirely closed position owing to a defect or deficiency. While the normal operating mode makes such a malfunction invisible, it becomes possible to detect this with the functional diagnosis according to the invention. It is therefore appropriate that the fluid flow valve is moved, within the scope of the invention, into an extreme position, that is to say into a position which it does not assume, or assumes only very rarely, in the normal state.

Example 5

The invention can also be used for the functional monitoring of safety components such as, for example, a fire damper. Motor-operated fire dampers are known and have to be checked regularly owing to safety regulations. They are normally in a position of rest (for example entirely opened or closed position) in which they are intended to stay in the normal operating mode of the HVAC system. A functional diagnosis can be carried out by remote maintenance by means of a test actuation and measurement of the fluid flow.

Figure 3:
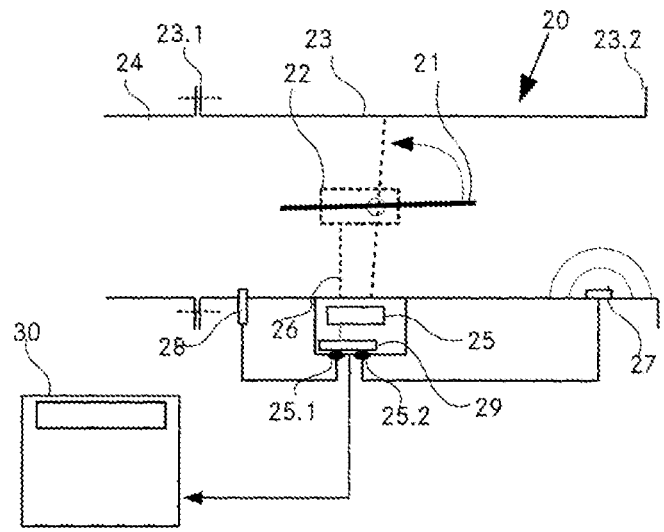
FIG. 3 shows a schematic illustration of a fire damper device with the functional diagnosis.

FIG. 3 shows the application of the invention in a fire damper device 20. The latter has a flap 21 which is actuated by a motor 22 (illustrated schematically). The motor 22 is attached, for example, on the outside of the tubular section 23 to the rotational axis of the flap 21. The tubular section 23 forms, as it were, the housing of the fire damper device 20 and can be connected via connection flanges 23.1, 23.2 to continuous fluid duct sections 24 of the HVAC system. A control circuit 25 is provided on the outside of the tubular section 23, said control circuit 25 being designed in such a way that it can carry out the functional diagnosis according to the invention. The control circuit 25 is illustrated here as a separate module which is connected via lines 26 to the motor 22.

An electro-acoustic transducer 27 (as an electrically actuable sound source) and a microphone 28 (as a sound sensor) are also provided in the interior of the tubular section 23. Said transducer 27 and microphone 28 are positioned on opposite sides of the flap 21 and connected to the control circuit via interfaces 25.1, 25.2. When the flap 21 is closed, the electro-acoustic transducer 27 and the microphone 28 are situated in two separate spatial regions.

In the normal operating mode, the flap 21 is always in the completely open position. In an emergency, the flap 21 must, however, close (dashed illustration). In order then to carry out a functional diagnosis, a control signal for closing the flap 21 is generated by the control circuit 25 within the scope of the invention. The control circuit 25 then actuates the electro-acoustic transducer 27, which generates a sound signal in the tubular section 23. The sound level is measured by means of the microphone 28 and processed by the control circuit 25. The sound level at the location of the microphone 28 is attenuated by the closed position (illustrated by dashed lines) of the flap 21. If the attenuation with the flap closed 21 is less than a stored limiting value, it is to be assumed that the flap 21 is not closing sufficiently. The functional diagnosis therefore outputs the state "faulty" as a result. This diagnostic value is transmitted, for example, to the computer 29 of a maintenance center 30.

Figure 2:
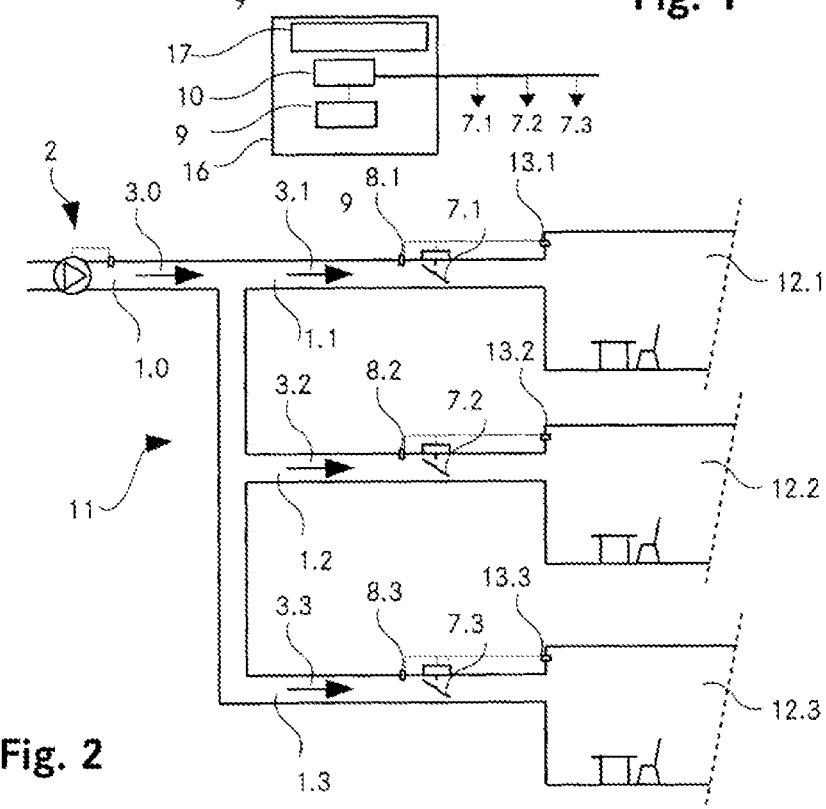
FIG. 2 shows a ventilation system in which the invention is used.

FIG. 2 shows an HVAC system with a fluid flow duct system 11 which is configured to perform air-conditioning of a plurality of spaces 12.1, 12.2, 12.3. For this purpose, a fluid flow 3 is generated by a fluid flow drive 2 in a fluid flow duct 1.0. The fluid flow duct 1.0 and therefore the fluid flow 3.0 branch into a plurality of fluid flow ducts 1.1, 1.2, 1.3, in each of which a fluid flow 3.1, 3.2, 3.3 is therefore conducted. In each case a fluid flow sensor 8.1, 8.2, 8.3 and in each case a fluid flow valve 7.1, 7.2, 7.3 are arranged in the fluid flow ducts 8.1, 8.2, 8.3. The fluid flow drive 2, the fluid flow valves 7.1, 7.2, 7.3 and the fluid flow sensors 8.1, 8.2, 8.3 are connected by signals to a control circuit 10 which comprises control modules in order to actuate the fluid flow drive 2 and the fluid flow valves 7.1, 7.2, 7.3, and comprises sensing modules for acquiring measurement data of the fluid flow sensors 8.1, 8.2, 8.3. In order to acquire spatial climatic data, spatial sensors 13.1, 13.2, 13.3 are provided, which sense, for example, a temperature, a humidity, a spatial pressure or any other spatial climatic data.

Figure 4:
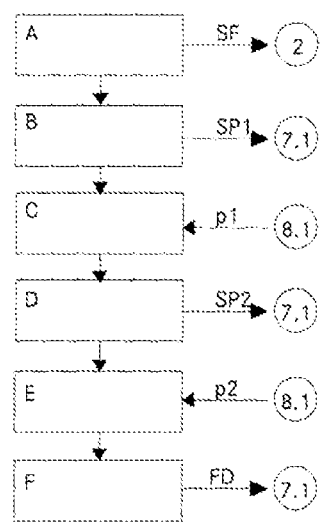
FIG. 4 shows a schematic illustration of an advantageous method.

The sequence is as follows (FIG. 4):

A: In order to perform automated functional monitoring of the fluid flow valves 7.1, 7.2, 7.3, a control signal SF is generated by the control circuit 10 in order to set the fluid flow drive 2 to a specific power level and to produce a fluid flow 3.0.

B: The control circuit 10 then generates a control signal SP1 in order to set a first fluid flow valve 7.1 to a first setpoint position and to completely close the remaining fluid flow valves 7.2, 7.3.

C: The fluid pressure p1 is sensed by the first fluid flow sensor 8.1 and stored in the evaluation unit 9.

D: A control signal for a second setpoint position is then output to the fluid flow valve 7.1, and the corresponding sensor signal is sensed.

E: A fluid pressure p2 is sensed in turn by the first fluid flow sensor 8.1 and stored in the evaluation unit 9.

F: On the basis of the fluid pressure measurement by the first fluid flow sensor 8.1, it is checked whether the pressure difference is within the tolerance of, for example, 10% with respect to a setpoint value which corresponds to the adjustment of the first fluid flow valve 7.1. If this is the case, the evaluation unit 9 signals that the functional state of the first fluid flow valve 7.1 is satisfactory (functional diagnosis FD). An analogous procedure is adopted for the functional monitoring of the further fluid flow valves 7.2, 7.3.

The fluid flow 3 can also be a water flow with predefinable parameters such as the temperature, the flow speed, the pressure or any other parameter.

In summary it is to be noted that a method and system have been described which permit efficient functional monitoring of an HVAC system. The functional monitoring takes place in a completely automated fashion and can therefore be carried out frequently and cost-effectively.

The invention claimed is:

1. A method for automated functional monitoring of an HVAC (heating, ventilation and air-conditioning) system which comprises
    a) a fluid flow duct,
    b) a fluid flow valve which is arranged in the fluid flow duct and has a valve body in the fluid flow duct and a valve motor which moves the valve body,
    c) a control circuit for actuating the valve motor,
    d) a sensor in the fluid flow duct, said sensor being installed in the fluid valve, in a housing or in a tubular part of the fluid flow valve, said sensor comprising an electro-acoustic transducer and a microphone positioned on opposite sides of said valve body and
    e) an evaluation module for evaluating signals of the sensor,
    comprising the following steps:
    f) predefining a first actuation signal to the valve motor by means of the control circuit, wherein the actuation signal corresponds to a first setpoint position of the valve body which is different from a present position of the valve body, whereby the valve motor moves said valve body to said first setpoint position,
    g) generating a first signal with the electro-acoustic transducer;
    h) registering the first signal received by the microphone by means of the evaluation module, and
    i) determining a functional diagnosis of the fluid flow valve based on an attenuation of a sound level of said first signal to determine whether the valve body has been moved to the first setpoint position.

2. The method as claimed in claim 1, wherein the functional diagnosis is determined as the possible result of at least two setpoint positions of the valve body.

3. The method as claimed in claim 1 or 2, comprising the functional diagnosis is transmitted to a central unit which is configured to monitor a plurality of fluid flow valves.

4. The method as claimed in claim 1, wherein, prior to the registration of the first signal of the sensor, a fluid flow is made available in the fluid flow duct of the HVAC system.

5. The method as claimed in claim 1, wherein the first setpoint position is a closed position of the valve body.

6. The method as claimed in claim 1, wherein, before the first actuation signal is predefined or after the registration of the first signal of the sensor, the following steps are carried out:
    a) predefining a second actuation signal, different from the first actuation signal, to the valve motor by means of the control circuit, wherein the second actuation signal corresponds to a second setpoint position of the fluid flow valve,
    b) generating a second signal with the electro-acoustic transducer;
    c) registering the second signal received by the microphone, and
    d) determining the functional diagnosis of the fluid flow valve based on an attenuation of a sound level of said second signal by means of the evaluation module, to determine whether the valve body has been moved to said first and second setpoint position, respectively.

7. The method as claimed in claim 1, wherein the functional diagnosis is determined in such a way that the proper seal of the fluid flow duct is determined as a functional state.

8. The method as claimed in claim 1, wherein the fluid flow valve is a fire damper, and wherein functional diagnosis is determined in such a way that the sealed closing of the fire damper is determined.

9. System for automated functional monitoring of an HVAC (heating, ventilation and air-conditioning) system, comprising:
    a) a fluid flow duct,
    b) a fluid flow valve which is arranged in the fluid flow duct and has a valve body in the fluid flow duct and a valve motor which moves the valve body and which has the purpose of actuating the fluid flow valve,
    c) a control circuit for controlling the valve motor,
    d) a sensor in the fluid flow duct, said sensor being installed in the fluid valve, in a housing or in a tubular part of the fluid flow valve, said sensor comprising an electro-acoustic transducer and a microphone positioned on opposite sides of said valve body,
    wherein
    e) the control circuit is designed to predefine a first actuation signal to the valve motor corresponding to a first setpoint position of said valve body, and wherein f) an evaluation module is designed to determine a functional diagnosis of the fluid flow valve on the basis of an attenuation of a sound level of a signal generated by said electro-acoustic transducer and received by the microphone, to determine whether the valve body has been moved to said first setpoint position.

10. The system as claimed in claim 9, further comprising a fluid flow drive for making available a fluid flow in the fluid flow duct.

11. The system as claimed in claim 9, wherein the evaluation module has a memory for storing reference data, and wherein the evaluation module is embodied in such a way that the functional diagnosis is determined on the basis of a comparison of the signal of the sensor with the reference data.

12. The system as claimed in claim 9, wherein the evaluation module is designed in such a way that the adjustment of the fluid flow valve or the sealing of a fluid flow duct are determined on the basis of the signal of the sensor as a functional diagnosis of the HVAC system.

13. A fluid flow valve for installation in a fluid flow duct of an HVAC system, comprising
   a) a valve body which can be arranged in the fluid flow duct,
   b) a valve motor which moves the valve body and has the purpose of actuating the fluid flow valve,
   c) a control circuit for controlling the valve motor,
   d) a sensor which can be arranged in the fluid flow duct and which is installed in the fluid valve, in a housing or in a tubular part of the fluid flow valve, said sensor comprising an electro-acoustic transducer and a microphone positioned on opposite sides of said valve body,
   e) an evaluation module for evaluating signals of the sensor,
   f) wherein the control circuit is designed to predefine a first actuation signal to the valve motor, wherein the actuation signal corresponds to a first setpoint position of the valve body,
   g) wherein the evaluation module is designed to register the first signal generated by the electro-acoustic transducer received by the microphone and to calculate a functional diagnosis of the fluid flow duct on the basis of the attenuation of a sound level of said first signal to determine whether the valve body has been moved to said first setpoint position.

14. The fluid flow valve as claimed in claim 13, wherein a control signal is designed to predefine a second actuation signal and corresponding to a second fluid speed, second fluid pressure or second fluid volume, different from the first actuation signal, to the valve motor, wherein the actuation signal corresponds to a second setpoint position of the fluid flow valve, and wherein, during the determination of the functional diagnosis, the evaluation module takes into account a second signal which is registered by the sensor.

* * * * *